E. LAMPEL.
COMBINED SCREEN AND INSECT TRAP.
APPLICATION FILED SEPT. 10, 1914.
1,134,875.
Patented Apr. 6, 1915.
2 SHEETS—SHEET 1.
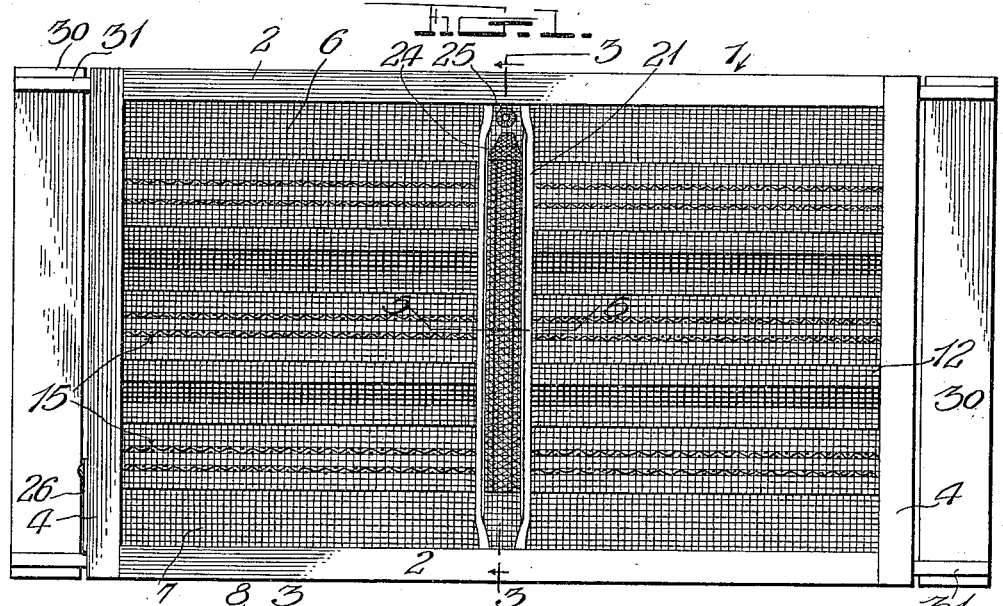
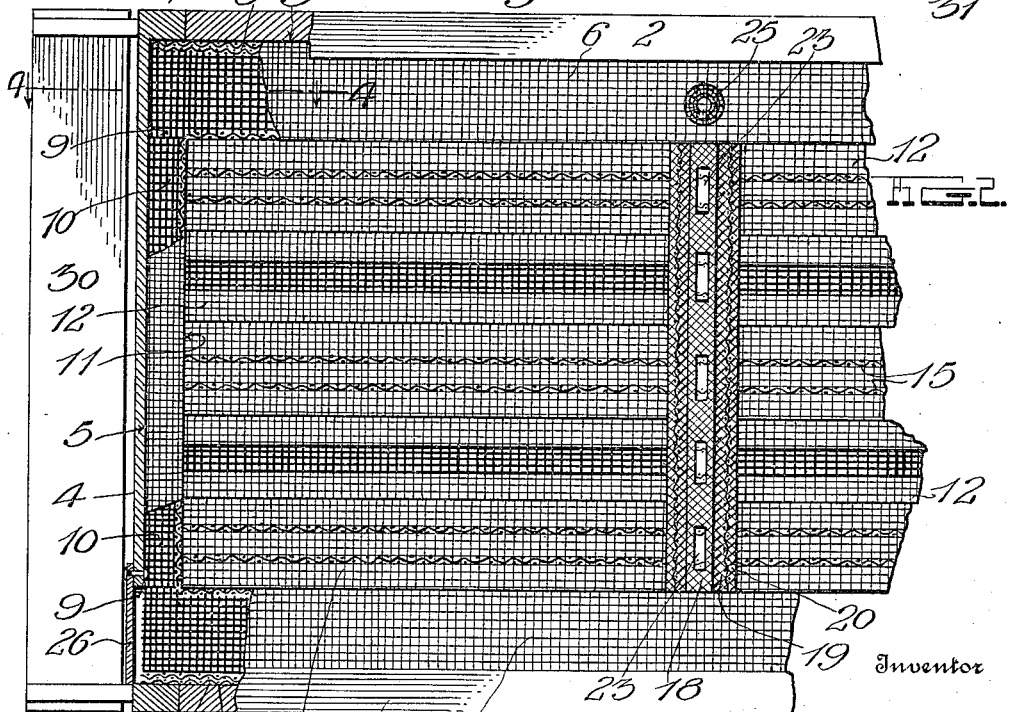
Witnesses
H. Woodard
C. Clemson
Inventor
Edward Lampel
By H. B. Willson & Co.
Attorneys

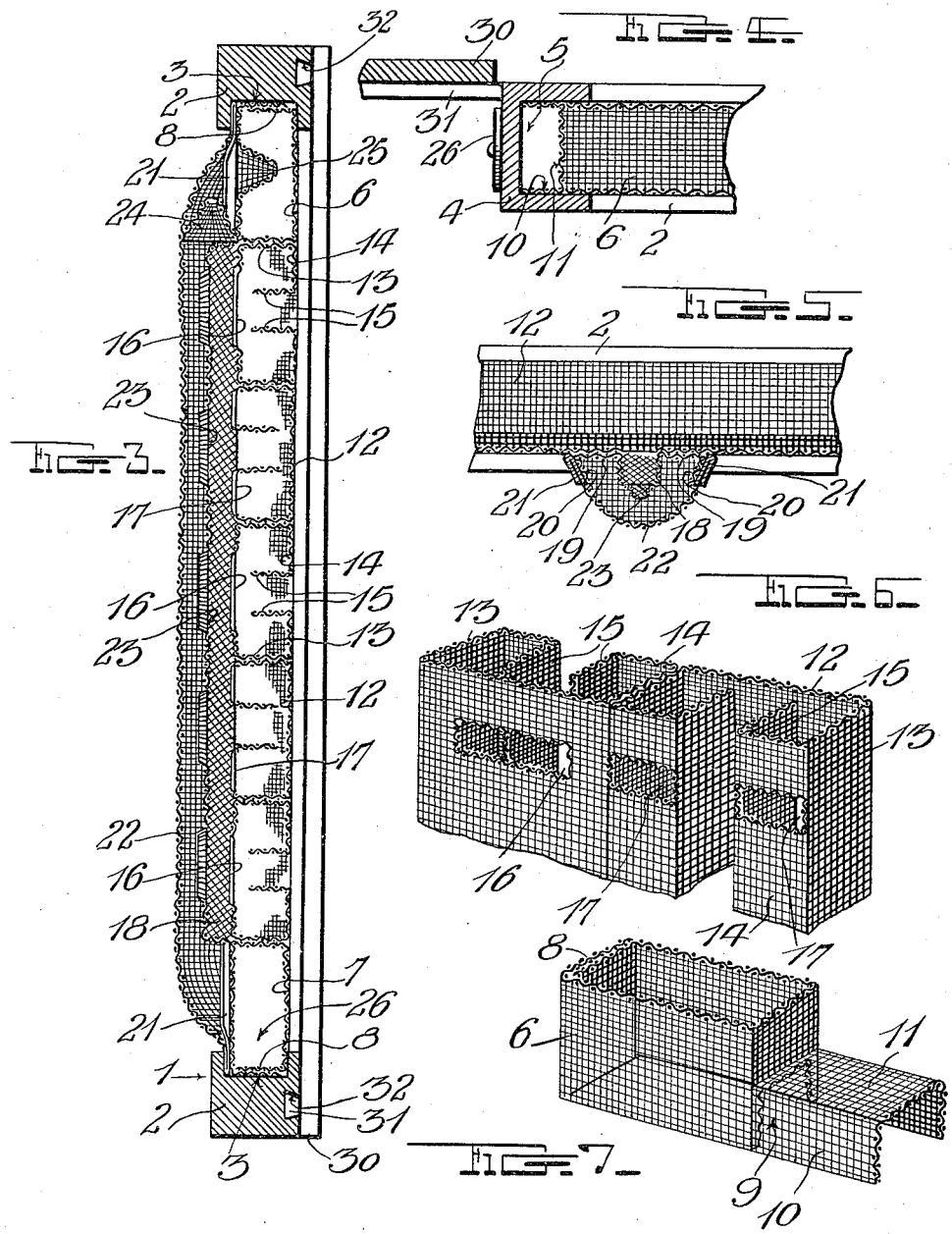

UNITED STATES PATENT OFFICE.

EDWARD LAMPEL, OF SAN FRANCISCO, CALIFORNIA.

COMBINED SCREEN AND INSECT-TRAP.

1,134,875. Specification of Letters Patent. Patented Apr. 6, 1915.

Application filed September 10, 1914. Serial No. 861,112.

*To all whom it may concern:*

Be it known that I, EDWARD LAMPEL, a citizen of the United States, residing at San Francisco, in the county of San Francisco and State of California, have invented certain new and useful Improvements in Combined Screens and Insect-Traps; and I do declare the following to be a full, clear, and exact description of the invention, such as will enable others skilled in the art to which it appertains to make and use the same.

My invention relates to improvements in combined window screens and fly traps and has for its object to provide a device of this character which may be simply and inexpensively manufactured and which will be extremely efficient in operation.

A further object of the invention is to construct a number of receiving chambers in an extremely simple manner.

A still further object is to provide simple means whereby the insects may be conducted from the receiving chambers to a receptacle.

A still further object is to provide an internally channeled frame for supporting the receiving chambers and the receptacles and to position a pair of channel shaped guide members in the channels of the end bars of said frame, in such a manner as to form a closure for the opposite ends of the receiving chambers.

With these objects in view, the invention resides in certain novel features of construction and combination herein described and claimed and shown in the drawings wherein:—

Figure 1 is a front elevation of a screen constructed in accordance with my invention; Fig. 2 is a front elevation, partly in section, showing portions of the parts illustrated in Fig. 1, on an enlarged scale, the outermost guide member being removed; Fig. 3 is an enlarged vertical section taken along the plane of the line 3—3 of Fig. 1; Figs. 4 and 5 are enlarged horizontal sections taken along the planes of the lines 4—4 and 5—5 of Figs. 2 and 1 respectively; and Figs. 6 and 7 are sectional perspective views of portions of two of the receiving chambers and one of the receptacles.

In the accompanying drawings, I have illustrated my invention as including a rectangular frame 1 which comprises longitudinal side bars 2 which are internally channeled as indicated at 3, and transverse end bars 4 which are provided, on their inner edges, with channels 5.

Having their outer edges inserted within the channels 3, are upper and lower insect receptacles 6 and 7, each of which is formed of a single strip of wire mesh or netting which is bent into the form of a rectangle in cross section, the free ends of said netting overlapping as indicated at 8. Each of the inner edges of the receptacles, thus formed, is provided with a notch 9 at each of its ends, said notches registering with U-shaped channel members 10 which are inserted within the channels 5, their opposite ends contacting with the receptacles 6 and 7 while their transversely extending portions 11 act as closures for the opposite ends of a number of receiving chambers 12 which are each formed of a single strip of wire netting having its opposite side portions bent laterally to provide edge walls 13, the free edges of said walls being bent inwardly into parallel relation with the body portion of the netting to provide side walls 14, the latter having their free extremities bent inwardly into parallel spaced relation to each other and to the edge walls 13 thus forming flanges 15 which terminate a suitable distance from the body portion of the chambers 12.

As clearly seen in the drawings, the opposite ends of the members 12 are positioned in the channels 5 and have their open ends disposed in contact with the transverse portions 11 of the U-shaped channel members 10 as above suggested. It will further be noted that the outermost edges of the upper and lower chambers 12 contact with the adjacent edges of the receptacles 6 and 7 while the remaining edges of said chambers contact one with the other, producing a screen formed of a number of receiving chambers and insect receptacles.

It may be here explained that, by constructing the receiving chambers in the manner above set forth, a number of longitudinally extending inlet slots are provided between the flanges 15, certain of these slots being formed in the rear side of the members 12 while others are formed in the front side thereof, thereby allowing the screen to be equally effective whether one side or the other be turned outwardly.

As most clearly seen in Figs. 3 and 6 the slotted side walls of certain of the chambers 12 are provided with outlet openings or slots 16 which extend transversely thereof while the slotted walls are provided with outlet slots 17 which are alined with the slots 16, it being understood that these slots are made upon one side of the screen only as will be evident by reference to the drawings.

Disposed transversely upon the various receiving chambers 12, is a channel shaped guide member 18 which is disposed over the various outlet slots 16 and 17 and which terminates adjacent the inner edges of the receptacles 6 and 7, the opposite edges of said member being provided with laterally projecting flanges 19 whose free edges are bent outwardly into substantially parallel relation to the side walls of the member 18, shown at 20, this formation producing substantially L-shaped flanges on the free edges of the guide member 18, which extend throughout the length thereof. By reference more particularly to Fig. 5, it will be seen that the flanges 19 contact with the chambers 12 while the extensions 20 thereof contact with U-shaped strips 21 in which the opposite edges of a second channel shaped guide member 22 are clamped, said member 22 being spaced a suitable distance from the member 18 and being in communication therewith by a number of outlet openings 23 which are formed in said member 18. The opposite ends of the strips 21 are rigidly secured in the channels of the longitudinal side bars 2 in any suitable manner.

As most clearly seen in Fig. 3, the guide member 22 is provided with a substantially funnel-shaped partition 24 which is located between the adjacent end of the member 18 and a funnel-shaped inlet 25 which is formed in one side of the receptacle 6.

With the parts as above described, the operation of the device is as follows: The flies or insects enter the various receptacles 12 through the slots between the flanges 15, said flanges acting to prevent the same from readily leaving said chambers. The trapped insects will now move back and forth within the chambers until they discover the outlet openings or slots 16 or 17, as the case may be, through which they will pass, thus entering the channel shaped guide member 18 which they may now leave through the openings 23 thus allowing them to move freely within the guide member 22 from which they may pass through the opening in the funnel shaped partition 24 and through the funnel shaped inlet member 25 into the receptacle 6 from which it will be a difficult task for them to escape by retracing their movements. When however, it becomes necessary to remove the trapped insects or flies, a suitable door 26 which is pivoted to one of the end bars of the frame 1, may be swung aside. This discharge opening might well be positioned at any other point around the frame since the trapped insects have access to all parts thereof, by the herein described positioning of the receptacles 6 and 7 and the guide members 10 which constitute passageways establishing communication between the two.

In most cases it becomes expedient to provide means whereby the length of the frame may be increased or diminished, this means being here shown in the form of end plates 30 which are provided with inwardly extending arms 31 which are shaped to fit undercut grooves 32 formed in the longitudinal side bars of the frame.

I have described my invention with considerable minuteness but I do not wish to be limited to details other than those amplified in the appended claims.

Having thus described my invention, what I claim as new and desire to secure by Letters Patent is:—

1. A combined window screen and insect trap comprising a rectangular frame, a number of elongated rectangular receiving chambers therein and disposed side by side, each chamber having a longitudinal inlet slot and an outlet opening, an insect receptacle likewise carried by the frame, and a guide member establishing communication between the several outlet openings of said chambers and said receptacle.

2. A combined window screen and insect trap comprising a rectangular frame, a number of elongated rectangular receiving chambers therein and disposed side by side, each chamber having a longitudinal inlet slot and an outlet opening, flanges extending into the interior of each chamber from opposite sides of said slots, an insect receptacle likewise carried by the frame, and a guide member establishing communication between said outlet openings and said receptacle.

3. A device of the character described comprising a rectangular frame channeled on its inner edge, a number of elongated rectangular receiving chambers having their ends mounted in the channels of two of the parallel bars of said frame, the edge walls of said chambers being disposed contiguous to each other and each of said chambers having a longitudinal inlet slot and an outlet opening, an elongated rectangular insect receptacle having one edge located in the channel of one remaining side bar of the frame and having its opposite edge in contact with the outer edge wall of the receiving chamber adjacent thereto, and a guide member establishing communication between said outlet openings and said receptacle.

4. A device of the character described comprising a rectangular frame channeled on its inner edge, a pair of elongated rectangular receptacles having their outer edges located in the channels of two parallel sides of the frame, passageways located in the channels of the remaining sides of the frame and communicating with said receptacles, elongated rectangular receiving chambers having their ends located in the channels receiving the passageways and abutting the inner walls of said passageways, each of said chambers having a longitudinal inlet slot and an outlet opening, and a guide member positioned transversely of said chambers and establishing communication between said outlet openings and one of said receptacles, the outer edges of the outermost of said chambers contacting with said receptacles and the remaining edges of the chambers contacting one with the other.

5. A device of the character described comprising a rectangular frame channeled on its inner edge, a pair of elongated rectangular receptacles having their outer edges located in the channels of two parallel sides of the frame, passageways located in the channels of the remaining sides of the frame and communicating with said receptacles, elongated rectangular receiving chambers having their ends located in the channels receiving the passageways and abutting the inner walls of said passageways, each of said chambers having a longitudinal inlet slot and an outlet opening, longitudinal flanges projecting into the interior of said chambers from opposite sides of said slots, and a guide member positioned transversely of said chambers and establishing communication between said outlet openings and one of said receptacles, the outer edges of the outermost of said chambers contacting with said receptacles and the remaining edges of the chambers contacting one with the other.

6. A device of the character described comprising a rectangular frame, a number of receiving chambers therein and each formed of a single strip of wire mesh having its opposite side portions bent laterally in the same direction to form edge walls lying in substantially parallel relation, the free edges of said walls being bent inwardly toward each other and lying substantially parallel to the body portion of the mesh to form side walls, and the free edges of said side walls being bent inwardly into spaced relation to each other and to said edge walls, each of said chambers having an outlet opening, an insect receptacle mounted in the frame, and a guide member establishing communication between said outlet openings and said receptacle.

7. A device of the character described comprising a rectangular frame having its end bars channeled on their inner edges, U-shaped channel members in the channels of said end bars and terminating at points spaced from the ends of said channels, insect receptacles adjacent the side bars of the frame and having their ends inserted in the ends of said channels and communicating with said U-shaped members, a number of receiving chambers having inlet and outlet openings, the ends of said chambers being inserted in said channels and closed by said U-shaped members, and a guide member establishing communication between the outlet openings of said chambers and one of said receptacles.

8. A device of the character described comprising a rectangular frame, a number of receiving chambers therein and each having an inlet and an outlet opening, a channel shaped guide member disposed over said outlet openings and having in itself a number of outlet openings, a second channel shaped guide member disposed over said first mentioned member, and an insect receptacle having an opening communicating with said second mentioned guide member.

9. A device of the character described comprising a rectangular frame, a number of receiving chambers therein and each having an inlet and an outlet opening, the latter being transversely alined, a channel shaped guide member disposed over said outlet openings and having in itself a number of outlet openings, longitudinal L-shaped flanges projecting laterally from the opposite edges of said guide member, a second guide member disposed over said first mentioned member and having its opposite edges contacting with the L-shaped flanges, U-shaped strips securing said edges to the flanges and having their opposite ends secured to said frame, and an insect receptacle having an opening communicating with said second mentioned guide member.

10. A device of the character described comprising a number of parallel receiving receptacles each having a longitudinal inlet slot, the slots in adjacent chambers being located alternately in opposite sides thereof, and means for receiving the insects from said chambers.

11. A combined insect trap and window screen comprising a rectangular frame adapted to be disposed in a window frame, a plurality of receiving chambers disposed side by side in said frame, said chambers being formed of screen wire whereby to provide a window screen and each of said chambers being provided with an inlet and with an outlet opening, an insect receptacle likewise carried by the frame, and an insect guide leading from the various outlet openings into the receptacle.

In testimony whereof I have hereunto set my hand in presence of two subscribing witnesses.

EDWARD LAMPEL.

Witnesses:
E. P. SCHMIDT,
M. A. WAGONER.

Copies of this patent may be obtained for five cents each, by addressing the "Commissioner of Patents, Washington, D. C."